US00RE48391E

(19) United States
(12) Reissued Patent
Karabinis

(10) Patent Number: US RE48,391 E
(45) Date of Reissued Patent: Jan. 12, 2021

(54) SYSTEMS OF MIXING FIRST AND SECOND SUBSTANCES

(71) Applicant: Odyssey Wireless, Inc., Cary, NC (US)

(72) Inventor: Dimitrios P. Karabinis, Edmonds, WA (US)

(73) Assignee: Odyssey Wireless, Inc., Cary, NC (US)

(21) Appl. No.: 15/426,165

(22) Filed: Feb. 7, 2017

Related U.S. Patent Documents

Reissue of:
(64) Patent No.: 9,061,794
Issued: Jun. 23, 2015
Appl. No.: 13/760,411
Filed: Feb. 6, 2013

U.S. Applications:
(63) Continuation-in-part of application No. 12/563,393, filed on Sep. 21, 2009, now Pat. No. 8,394,439.

(60) Provisional application No. 61/103,451, filed on Oct. 7, 2008.

(51) Int. Cl.
*B65D 81/32* (2006.01)
*B65D 25/00* (2006.01)

(52) U.S. Cl.
CPC ..... *B65D 81/3216* (2013.01); *B65D 25/00* (2013.01); *B65D 81/3266* (2013.01)

(58) Field of Classification Search
CPC . B65D 25/00; B65D 81/3216; B65D 81/3266
See application file for complete search history.

(56) References Cited

U.S. PATENT DOCUMENTS 3,779,372 A 12/1973 de Lloret ..... B65D 81/3222 206/222
4,247,001 A * 1/1981 Wiegner ..... B65D 81/3222 206/222
4,531,656 A 7/1985 Nitchman et al.
4,627,986 A 12/1986 Bardsley et al. ..... B65D 81/32 206/217
4,667,818 A * 5/1987 Evans ..... B65D 51/28 134/18
5,215,214 A * 6/1993 Lev ..... B65D 81/3216 220/502

(Continued)

OTHER PUBLICATIONS

Irish car bomb recipe, http://web.archive.org/web/20060818091401/http://www.drinknation.com/drink/Irish-Car-Bomb, Oct. 31, 2004, (2 pages).

*Primary Examiner* — Joseph A Kaufman
(74) *Attorney, Agent, or Firm* — Myers Bigel, P.A.

(57) ABSTRACT

Various embodiments of systems/methods relating to mixing of a plurality of substances are disclosed. Applications in medicine and in the pharmaceutical industry may be based on one or more of the systems/methods disclosed herein, providing mixing of first and second substances, as necessary, only a short time prior to dispensing thereof and/or in accordance with predetermined amounts of the first and second substances. Applications in the beverage industry may also be based upon various systems/methods disclosed herein, providing alcoholic and/or non-alcoholic mixing of a plurality of substances, as desired, a short time prior to dispensing and consuming and/or in accordance with precisely measured predetermined amounts, maximizing taste and enjoyment for the consumer.

20 Claims, 12 Drawing Sheets

- Embodiment with Rotation Mechanism (Side View with Seal of Container Removed)

(56) References Cited

U.S. PATENT DOCUMENTS 5,391,351 A * 2/1995 Kaufman ..... A61L 11/00 206/219
5,456,929 A * 10/1995 Mifune ..... B65D 81/3216 206/219
5,984,141 A 11/1999 Gibler ..... A47J 41/0027 206/219
6,390,292 B2 5/2002 Hawthorne ..... B65D 81/3222 206/219
6,719,130 B1 4/2004 Wagner ..... B65D 1/04 206/222
7,591,221 B2 * 9/2009 Ho ..... A47J 43/24 206/219
8,839,982 B1 * 9/2014 Anderson et al. ..... B65D 51/2835 206/222
2005/0150902 A1 * 7/2005 Cho ..... B65D 51/2892 206/219
2006/0102581 A1 * 5/2006 Yates, III ..... B65D 81/3216 215/6
2010/0044377 A1 * 2/2010 Porter ..... B65D 51/2828 220/212
2010/0163438 A1 * 7/2010 Shim ..... B65D 25/08 206/219
2010/0163442 A1 * 7/2010 Lee et al. ..... B65D 47/243 206/222
2010/0200437 A1 * 8/2010 Coon ..... B65D 25/085 206/222
2010/0236952 A1 * 9/2010 Masterson et al. ..... B65D 51/2835 206/222
2013/0213832 A1 * 8/2013 Justo ..... A47J 31/3676 206/221
2013/0220877 A1 * 8/2013 Stern ..... B65D 25/00 206/736

* cited by examiner

FIG. 1 - Container and sub-container closed

FIG. 2- Container and sub-container opened

- Container and sub-container closed

- Container and sub-container open

- A two tether embodiment

- Corrogated Surface Embodiment
(Prior to Initiating Mixing)

- Corrogated Surface Embodiment (After Initiating Mixing)

- Corrogated Surface Embodiment
(Prior to Initiating Mixing by Pulling)

- Corrogated Surface Embodiment
(After Initiating Mixing by Pulling)

- Embodiment with Rotation Mechanism
(Side View with Seal of Container in Place)

- Embodiment with Rotation Mechanism
(Side View with Seal of Container Removed)

- Top View of Rotation Mechanism

- Top View of Alternate Rotation Mechanism

SYSTEMS OF MIXING FIRST AND SECOND SUBSTANCES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part (CIP) application of U.S. patent application Ser. No. 12/563,393, entitled Mixing First and Second Substances Responsive to Opening of a Container, filed Sep. 21, 2009, which itself claims the benefit of Provisional Application Ser. No. 61/103,451, entitled Mixing First and Second Substances Responsive to Opening of a Container, filed Oct. 7, 2008, the disclosures of both of which are hereby incorporated herein by reference in their entirety as if set forth fully herein.

FIELD OF THE INVENTION

This invention relates to containers such as beverage containers.

BACKGROUND OF THE INVENTION

An "Irish car bomb" is an alcoholic drink wherein a relatively small glass containing Irish cream is dropped into a larger glass containing beer, thus allowing mixing of the Irish cream and beer, followed by drinking of the mixed substance. The mixing of the Irish cream with the beer is done at the last minute, prior to drinking, to avoid a loss in flavor and/or in appearance of the mixed substance that may occur if there is a longer lapse of time between the mixing and the drinking.

SUMMARY OF THE INVENTION

Some embodiments of the present invention provide a method of mixing a first substance that is contained within a container with at least one second substance that is contained within at least one sub-container that is rigidly attached to the container and is contained within the container, the method comprising: opening a seal of the container; and opening at least one seal of the at least one sub-container that is rigidly attached to the container and is contained within the container, responsive to the opening a seal of the container.

In some embodiments, the seal of the container is connected via at least one tether to the at least one seal of the at least one sub-container and wherein opening at least one seal of the at least one sub-container that is rigidly attached to the container and is contained within the container, responsive to the opening a seal of the container comprises: opening at least one seal of the at least one sub-container that is rigidly attached to the container and is contained within the container, responsive to the opening a seal of the container, substantially concurrently with the opening a seal of the container.

In further embodiments, opening at least one seal of the at least one sub-container that is rigidly attached to the container and is contained within the container, responsive to the opening a seal of the container comprises: selectively opening, at a time that is subsequent to a time of opening a seal of the container, at least one seal of the at least one sub-container that is rigidly attached to the container and is contained within the container, responsive to the opening a seal of the container.

According to additional embodiments, the method further comprises altering an orientation of the container from a substantially vertical orientation to a substantially horizontal orientation.

In yet further embodiments, the at least one tether comprises a length that is substantially equal to a straight-line distance between the seal of the container and the at least one seal of the at least one sub-container; whereas in other embodiments, the at least one tether comprises a length that is greater than a straight-line distance between the seal of the container and the at least one seal of the at least one sub-container.

According to additional embodiments of the invention, the first substance comprises beer and the at least one second substance comprises Irish cream and/or whiskey. In yet additional embodiments, the first substance comprises a first alcohol content and the at least one second substance comprises a second alcohol content; wherein the second alcohol content differs from the first alcohol content and, in some embodiments, the second alcohol content is greater than the first alcohol content.

In further embodiments of the invention, selectively opening, at a time that is subsequent to a time of opening a seal of the container, at least one seal of the at least one sub-container that is rigidly attached to the container and is contained within the container, responsive to the opening a seal of the container, comprises: exerting a force, at the time that is subsequent to the time of opening the seal of the container, on at least one tether that is attached to the seal of the container and is also attached to the at least one seal of the at least one sub-container. In yet further embodiments of the invention, opening at least one seal of the at least one sub-container that is rigidly attached to the container and is contained within the container, responsive to the opening a seal of the container, substantially concurrently with the opening a seal of the container, comprises: exerting a force on at least one tether that is attached to the seal of the container and is also attached to the at least one seal of the at least one sub-container, substantially concurrently with the opening a seal of the container.

According to still further embodiments, the method further comprises attaching at least one tether to the seal of the container and attaching the at least one tether to the at least one seal of the at least one sub-container.

According to additional embodiments of the invention, a container apparatus may be provided comprising: a container; a seal that comprises at least one tether that is attached thereto; and at least one sub-container that is rigidly attached to the container and is contained within the container; wherein the at least one sub-container comprises at least one seal that is attached to the at least one tether; wherein the container contains a first substance, the at least one sub-container that is rigidly attached to the container and is contained within the container contains at least one second substance, wherein the at least one seal of the at least one sub-container that is attached to the at least one tether is configured to alter a state thereof responsive to an altered state of the seal of the container and/or responsive to a force that is applied on the at least one tether and wherein mixing of the at least one second substance with the first substance occurs responsive to the altered state of the at least one seal of the at least one sub-container.

According to further embodiments of the invention, seal for a container is provided; the seal comprising: at least one tether that is attached thereto and is also attached to at least one other seal of at least one other container; wherein the at least one other container is configured to fit within the container and to be rigidly attached to the container, the container is configured to include a first substance, the at least one other container is configured to include at least one second substance and wherein mixing of the at least one second substance with the first substance is enabled responsive to a change of state of the seal, responsive to a force that is applied to the at least one tether and responsive to a change of state of the at least one other seal.

Some embodiments of the present invention provide a method of mixing a first substance that is contained within a container with a second substance that is contained within a first sub-container that is rigidly attached to the container and is contained within the container and with a third substance that is contained within a second sub-container that is also rigidly attached to the container and is contained within the container, the method comprising:

opening a first seal of the first sub-container by exerting a force on the first seal of the first sub-container responsive to opening a seal of the container and responsive to a coupling of the seal of the container with the first seal of the first sub-container; and opening a second seal of the second sub-container by exerting a force on the second seal of the second sub-container responsive to the opening of the seal of the container and responsive to a coupling of the seal of the container with the second seal of the second sub-container.

According to some embodiments, the coupling of the seal of the container with the first seal of the first sub-container and the coupling of the seal of the container with the second seal of the second sub-container facilitates/allows said opening a first seal of the first sub-container, opening the second seal of the second sub-container and opening the seal of the container to occur substantially simultaneously therebetween.

According to other embodiments, the coupling of the seal of the container with the first seal of the first sub-container and the coupling of the seal of the container with the second seal of the second sub-container facilitates/allows said opening a seal of the container to precede said opening a first seal of the first sub-container and/or said opening a second seal of the second sub-container.

According to additional embodiments, the coupling of the seal of the container with the first seal of the first sub-container and the coupling of the seal of the container with the second seal of the second sub-container facilitates/allows said opening a first seal of the first sub-container to precede said opening a second seal of the second sub-container.

In some embodiments, the first substance comprises beer, the second substance comprises Irish cream and the third substance comprises whiskey.

Other embodiments of the present invention provide a method of mixing a first substance that is contained within a container with a second substance that is contained within a first sub-container that is rigidly attached to the container and is contained within the container, the method comprising:

removing a seal of the container and exposing a mixing mechanism;

exerting a force on the mixing mechanism; and opening a first seal of the first sub-container by exerting a force on the first seal responsive to said exerting a force on the mixing mechanism;

wherein the seal of the container is devoid of any coupling to the mixing mechanism following said removing.

According to some embodiments of the invention, said exerting a force on the mixing mechanism comprises exerting a rotational force on the mixing mechanism, According to yet other embodiments of the invention, the first substance that is mixed with the second substance is further mixed with a third substance, the method further comprising: opening a second seal of a second sub-container, that that is rigidly attached to the container and is contained within the container and contains the third substance, by exerting a force on the second seal responsive to said exerting a force on the mixing mechanism.

According to additional embodiments, said exerting a force on the mixing mechanism comprises exerting a rotational force on the mixing mechanism; wherein according further embodiments, said exerting a rotational force on the mixing mechanism comprises exerting a first rotational force in a first direction; and exerting a second rotational force in a second direction that differs from the first direction.

According to yet other embodiments of the invention, the first substance comprises beer, the second substance comprises Irish cream and the third substance comprises whiskey.

Some embodiments of the present invention provide a method of mixing a first substance that is contained within a container with a second substance that is contained within a first sub-container that is rigidly attached to the container and is contained within the container, the method comprising:

exerting a force on a mixing mechanism that is attached to the container; and opening a first seal of the first sub-container by exerting a force on the first seal responsive to said exerting a force on the mixing mechanism;

wherein a removable seal of the container is configured to function independently of the mixing mechanism and the mixing mechanism is configured to function independently of the removable seal of the container; and wherein the removable seal of the container, whether on the container or removed from the container, is devoid of any coupling to the mixing mechanism that influences any function of the mixing mechanism.

According to some embodiments, said exerting a force on a mixing mechanism that is attached to the container occurs prior to removing the removable seal of the container.

According to other embodiments, the method further comprises:

following said exerting and opening, removing the removable seal of the container and dispensing a content thereof comprising a mixture of the first substance and second substance.

According to further embodiments, the container comprises a corrugated surface that is configured to deform responsive to said exerting a force.

According to additional embodiments, said exerting a force comprises exerting an outward force on the mixing mechanism and/or exerting an inward force on the mixing mechanism; wherein said outward force comprises a direction pointing away from the container and wherein said inward force comprises a direction pointing towards the container.

According to yet other embodiments, the first substance that is mixed with the second substance is further mixed with a third substance, the method further comprising:

opening a second seal of a second sub-container, that that is rigidly attached to the container and is contained within the container and contains the third substance, by exerting a force on the second seal responsive to said exerting a force on the mixing mechanism.

In some embodiments, the first substance comprises beer, the second substance comprises Irish cream and the third substance comprises whiskey.

Further to providing various embodiments of methods as summarized above or combinations, sub-combinations and/or variations thereof as will occur to those skilled in the art, the present invention also provides various embodiments of systems/apparatus as summarized below.

According to some embodiments of the invention, a container apparatus is provided comprising:

a container that includes a seal and a first substance;

a first sub-container that includes a seal and a second substance; and a second sub-container that includes a seal and a third substance;

wherein the first sub-container is rigidly attached to the container and is contained within the container and the second sub-container is also rigidly attached to the container and is contained within the container;

wherein a first component of the container is coupled to the seal of the first sub-container such that a force is exerted on the seal of the first sub-container responsive to opening the seal of the container; and wherein a second component of the container is coupled to the seal of the second sub-container such that a force is exerted on the seal of the second sub-container responsive to opening the seal of the container.

According to other embodiments, the first and/or second component of the container is coupled to the seal of the first sub-container and to the seal of the second sub-container such as to facilitate the seal of the first sub-container, the seal of the second sub-container and the seal of the container to open substantially simultaneously therebetween.

According to further embodiments, the first and/or second component of the container is coupled to the seal of the first sub-container and to the seal of the second sub-container such as to facilitate the seal of the container to open prior to the seal of the first sub-container and/or prior to the seal of the second sub-container.

According to additional embodiments, the first and/or second component of the container is coupled to the seal of the first sub-container and to the seal of the second sub-container such as to facilitate the seal of the first sub-container to open prior to the seal of the second sub-container.

In some embodiments, the first substance comprises beer, the second substance comprises Irish cream and the third substance comprises whiskey.

According to other embodiments of the invention, a container apparatus is provided comprising:

a container that includes a seal and a first substance; and a first sub-container that is rigidly attached to the container and is contained within the container and includes a seal and a second substance;

wherein the seal of the container is configured to expose a mixing mechanism upon removal thereof;

wherein the mixing mechanism is configured to open the seal of the first sub-container by exerting a force on the seal of the first sub-container responsive to a force that is exerted on the mixing mechanism; and wherein the seal of the container is devoid of any coupling to the mixing mechanism following said removing.

In some embodiments, the force that is exerted on the mixing mechanism comprises a rotational force.

According to other embodiments, the container apparatus further comprises:

a second sub-container that is rigidly attached to the container and is contained within the container and includes a seal and a third substance;

wherein the mixing mechanism is further configured to open the seal of the second sub-container by exerting a force on the seal of the second sub-container responsive to the force that is exerted on the mixing mechanism.

In some embodiments, the force that is exerted on the mixing mechanism comprises a rotational force and in some embodiments, said rotational force comprises:

a first rotational force in a first direction; and a second rotational force in a second direction that differs from the first direction.

According to some embodiments, the first substance comprises beer, the second substance comprises Irish cream and the third substance comprises whiskey.

According to further embodiments of the invention, a container apparatus is provided comprising:

a container that includes a seal and a first substance;

a mixing mechanism that is attached to the container; and a first sub-container that is rigidly attached to the container and is contained within the container and includes a seal and a second substance;

wherein the mixing mechanism is configured to open the seal of the first sub-container by applying a force thereto responsive to a force that is applied to the mixing mechanism;

wherein the seal of the container is configured to function independently of the mixing mechanism and the mixing mechanism is configured to function independently of the seal of the container; and wherein the seal of the container, whether on the container or removed from the container, is devoid of any coupling to the mixing mechanism that influences any function of the mixing mechanism.

In some embodiments, the mixing mechanism is configured so that a force is applied thereto prior to removing the seal of the container.

In other embodiments, the seal of the container is configured so that removal thereof occurs after a force is applied to the mixing mechanism and after the mixing mechanism opens the seal of the first sub-container responsive to a force that is applied thereto.

In further embodiments, the container comprises a corrugated surface that is configured to deform responsive to the force that is applied on the mixing mechanism.

In additional embodiments, the force that is applied on the mixing mechanism comprises applying an outward force on the mixing mechanism and/or applying an inward force on the mixing mechanism; wherein said outward force comprises a direction pointing away from the container and wherein said inward force comprises a direction pointing towards the container.

According to yet additional embodiments, the container apparatus further comprises:

a second sub-container that is rigidly attached to the container and is contained within the container and includes a seal and a third substance;

wherein the mixing mechanism is further configured to open the seal of the second sub-container by applying a force thereto responsive to a force that is applied to the mixing mechanism.

In some embodiments, the first substance comprises beer, the second substance comprises Irish cream and the third substance comprises whiskey.

According to yet other embodiments, the mixing mechanism is configured to open the seal of the first sub-container by applying a force on the mixing mechanism that is in a direction towards the container; and wherein the mixing mechanism is further configured to open the seal of the second sub-container by applying a force on the mixing mechanism that is in a direction away from the container.

DETAILED DESCRIPTION

Figure 1:
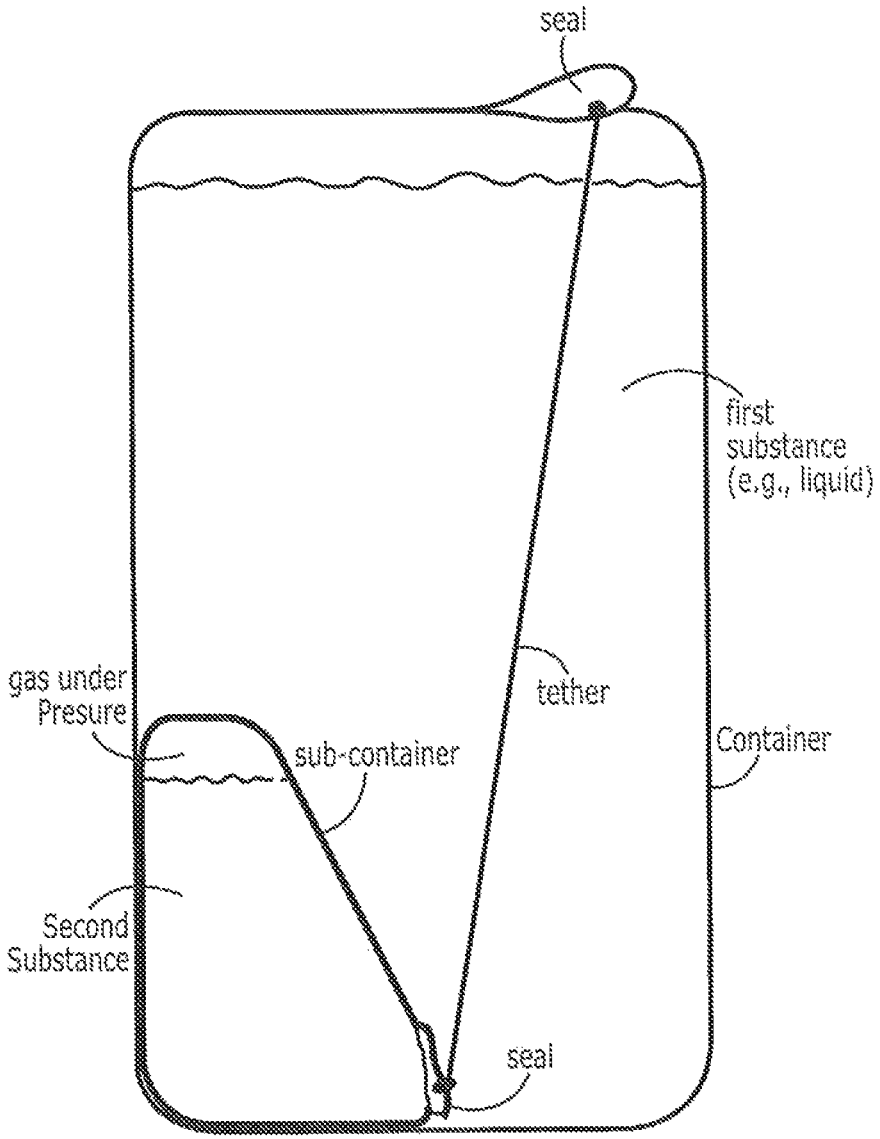
FIGS. 1, 2, 3, 4 and 5 are illustrative of methods, systems, containers, sub-containers, seals and/or tethers according to embodiments of the present invention.

The present invention is based upon a realization that it may be desirable to configure a container to include a substance, such as, for example, a liquid, that may, according to some embodiments of the present invention, be an alcoholic liquid, and to also include one or more sub-containers each one of which includes a substance, such as, for example, a liquid, that may, according to embodiments of the present invention, be an alcoholic liquid. The container may be configured to include a seal that may be an air-tight (or substantially air-tight) seal, to include a first substance that may be in the form of a liquid, to include at least one sub-container each one of which includes at least one seal, that may be an air-tight (or substantially air-tight) seal; the at least one sub-container including at least one second substance that may be in the form of a liquid, wherein the at least one second substance may be under pressure, as may be caused by a gas that has been forced inside of the at least one sub-container, and the container may also be configured to include at least one tether that is connected/attached to the seal of the container and is also connected/attached to the at least one seal of the at least one sub-container. In some embodiments, the substance that is included in the container and/or the at least one second substance that is included in the at least one sub-container may be subject to an absence of pressure, as may be caused by a vacuum that may be created inside of the container and/or inside of the at least one sub-container.

Accordingly, in some embodiments of the present invention, when a state of the seal of the container is altered (e.g., when the seal of the container is pulled, in order to open the container), the at least one tether that is connected/attached to the seal of the container is also pulled (i.e., a force is exerted on the at least one tether) and, owing to a first predetermined length of the at least one tether and to the at least one tether being connected/attached to the at least one seal of the at least one sub-container, at least one seal of the at least one sub-container is pulled/opened (i.e., a state thereof is altered), releasing the at least one second substance from within the at least one sub-container and allowing the at least one second substance to mix with the first substance within the container and/or within the at least one sub-container. According to further embodiments of the present invention, the at least one tether comprises a second predetermined length, wherein the second predetermined length is greater than the first predetermined length, such that when the seal of the container is pulled in order to open the container, the at least one tether that is connected/attached to the seal of the container is also pulled (i.e., experiences a force) but not sufficiently to influence/open and/or to alter/change the state of the at least one seal of the at least one sub-container. Accordingly, embodiments of the present invention comprising at least one tether of the second predetermined length, provide for selectively dispensing the at least one second substance contained by the at least one sub-container by further pulling (i.e., by further exerting a force) on the at least one tether at any desired time following opening of the container.

It will be understood that the at least one sub-container is connected/attached to the container and is within the container. It will further be understood that the at least one sub-container may be rigidly connected/attached to one or more internal surfaces, walls, bottom and/or top of the container so that the at least one sub-container is not able to move (linearly and/or rotationally) relative to the container. It will also be understood that each one of the container, the seal of the container, the at least one tether, the at least one sub-container and the at least one seal of the at least one sub-container may be made of any material and/or combination of materials including, but not limited to, glass, plastic, metal (e.g., aluminum), etc. According to some embodiments of the present invention, each one of the container, the seal of the container, the at least one tether, the at least one sub-container and the at least one seal of the at least one sub-container is made/constructed of metal and/or comprises metal. In further embodiments of the invention, each one of the container and the at least one sub-container is made/constructed of glass and/or comprises glass and each one of the at least one tether, the seal of the container and the at least one seal of the at least one sub-container is made/constructed of metal and/or comprises metal.

FIGS. 1, 2, 3, 4 and 5 are illustrative of embodiments according to the present invention. It will be understood that although specific shapes are associated with the container and the at least one sub-container, as illustrated in FIGS. 1, 2, 3, 4 and 5, any other shape(s) may be used for the container and/or the at least one sub-container according to other embodiments of the present invention. Further, it will be understood that although specific shapes are associated with the seal of the container, the at least one seal of the at least one sub-container and the at least one tether, as illustrated in FIGS. 1, 2, 3, 4 and 5, any other shape(s) may be used for the seal of the container, the at least one seal of the at least one sub-container and/or the at least one tether, according to further embodiments of the invention, and that the at least one tether may, according to some embodiments, be supported/restrained by an inner surface of the container via a mechanical configuration (e.g., via a "loop," which is attached to the inner surface of the container through which the at least one tether is passed), providing the support/restraint. It will further be understood that one or more other locations/positions/configurations for the seal of the container, the at least one seal of the at least one sub-container and/or the at least one tether may be used in yet other embodiments of the invention, as will surely occur to those skilled in the art.

Figure 2:
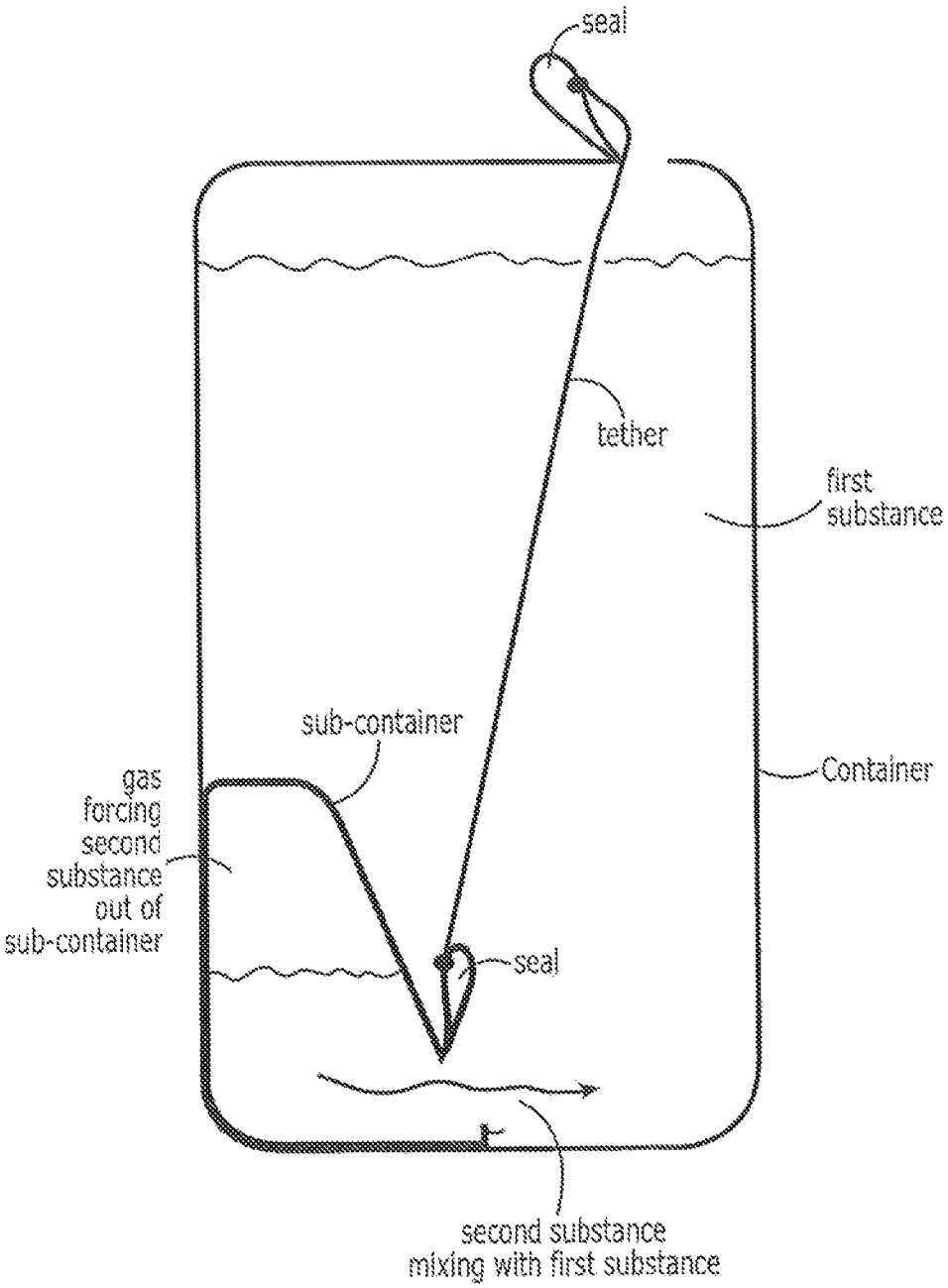

Specifically, FIG. 1 illustrates a container containing a first substance and also containing a sub-container which is rigidly attached to an interior wall of the container; wherein the sub-container contains a second substance and may also contain a gas under pressure, as is illustrated in FIG. 1. Still referring to FIG. 1, a seal of the container includes a tether that is attached thereto and is also attached to a seal of the sub-container. When the seal of the container and the seal of the sub-container are in their closed state, as is illustrated in FIG. 1, the first substance is maintained within the container and the second substance is maintained within the sub-container and the first substance is not allowed to mix with the second substance (or vice versa). When the seal of the container is pulled (i.e., opened), as is illustrated in FIG. 2, the tether that is attached thereto is also pulled, exerting a force on the seal of the sub-container, thus pulling and opening the seal of the sub-container, as is illustrated in FIG. 2, and allowing for the mixing of the second substance with the first substance, particularly as the container is tilted, as may be performed by a person in order to drink from the container.

Figure 3:
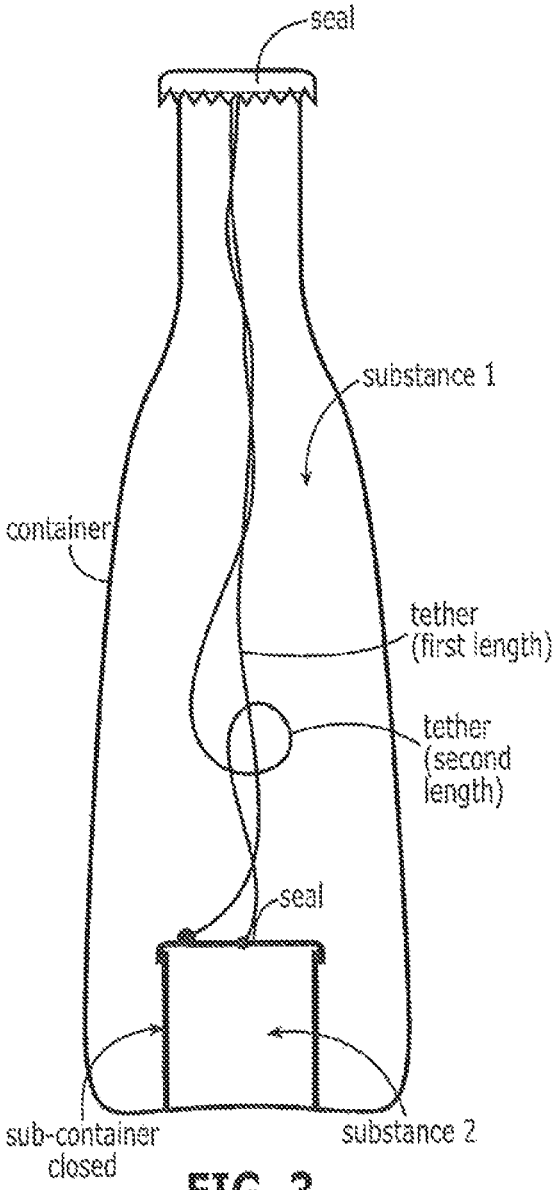

Referring now to FIG. 3, wherein additional embodiments of the invention are illustrated, the seal of the container may be connected to the seal of the sub-container via a tether comprising a first length and/or a tether comprising a second length. In some embodiments, only one of the two tethers may be used; either the tether comprising the first length or the tether comprising the second length. As is illustrated in FIG. 3, the tether comprising the second length is longer than the tether comprising the first length. Accordingly, in embodiments of the invention wherein the tether comprising the second length is used, the seal of the container may be opened without necessarily also opening, pulling and/or exerting a force on the seal of the sub-container. Thus, embodiments using the longer tether provide for selectively and/or preferentially opening of the seal of the sub-container at a time (at any time) following the opening of the seal of the container.

Figure 4:
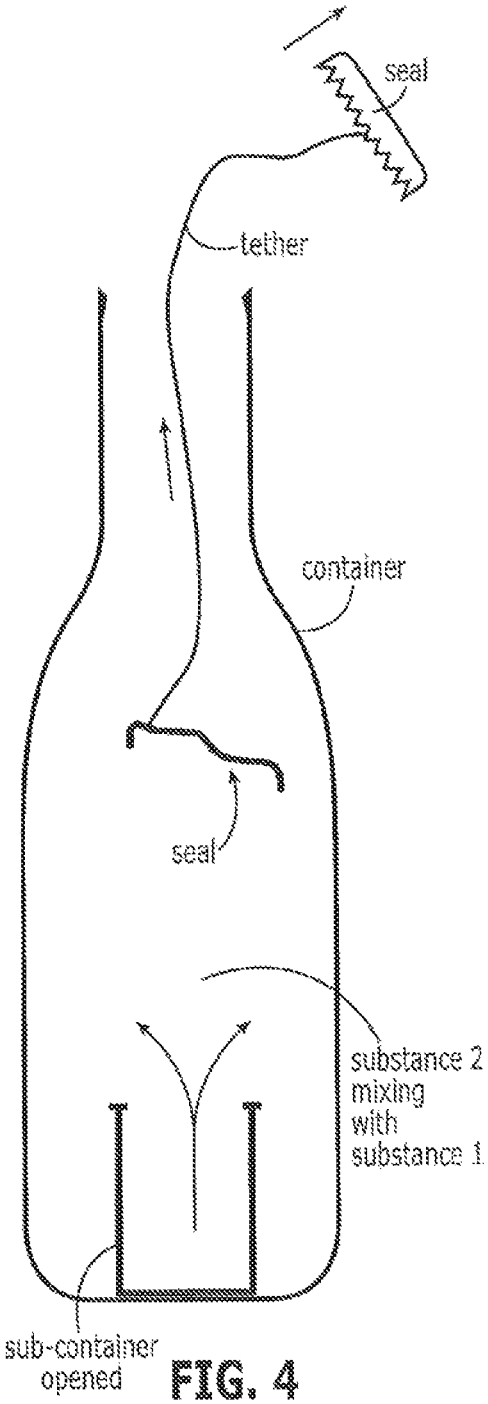
Figure 5:
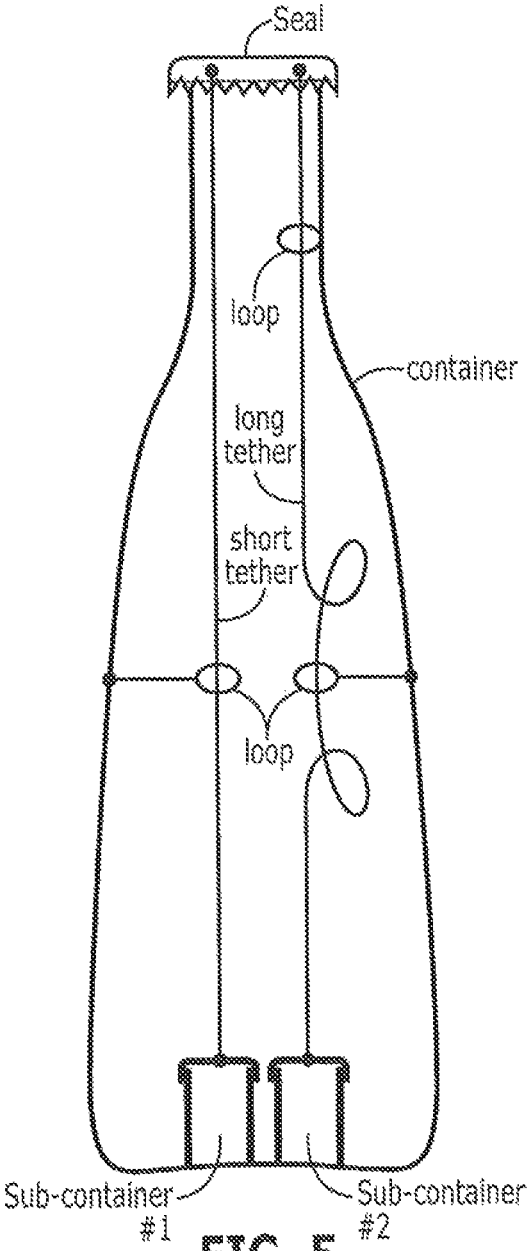

FIG. 4 illustrates a single tether connecting a substantially rigid seal of the container (e.g., a seal of the container along the lines of seals currently being used on glass beer bottles and/or other bottles) with a substantially flexible/malleable seal of the sub-container, wherein the seal of the container and the seal of the sub-container are illustrated as having been removed (opened) allowing for mixing of substance 1 with substance 2. In some embodiments, the seal of the sub-container may be substantially flexible and/or malleable so as to easily deform upon being pulled. This flexible and/or malleable feature of the seal of the sub-container may aid in opening and/or removing the seal of the sub-container from the sub-container and may also aid in removing the seal of the sub-container from within the container via the opening of the container that is produced by removing the seal of the container. In some embodiments, the seal of the sub-container and/or the tether may comprise one or more materials at least one of which is inert to the first substance (substance 1) and/or to the second substance (substance 2), and the seal of the sub-container and/or the tether may comprise plastic and/or aluminum. It will be understood that any element(s) of any one or more of the Figures/embodiments that are described herein may be combined with any other element(s) of any one or more of other Figures/embodiments that are described herein to provide one or more additional embodiments. Thus, for example, FIG. 5 illustrates an embodiment that includes a first sub-container, a first tether, a second sub-container and a second tether that is longer than the first tether. Support/restraining loops are also illustrated.

Figure 6:
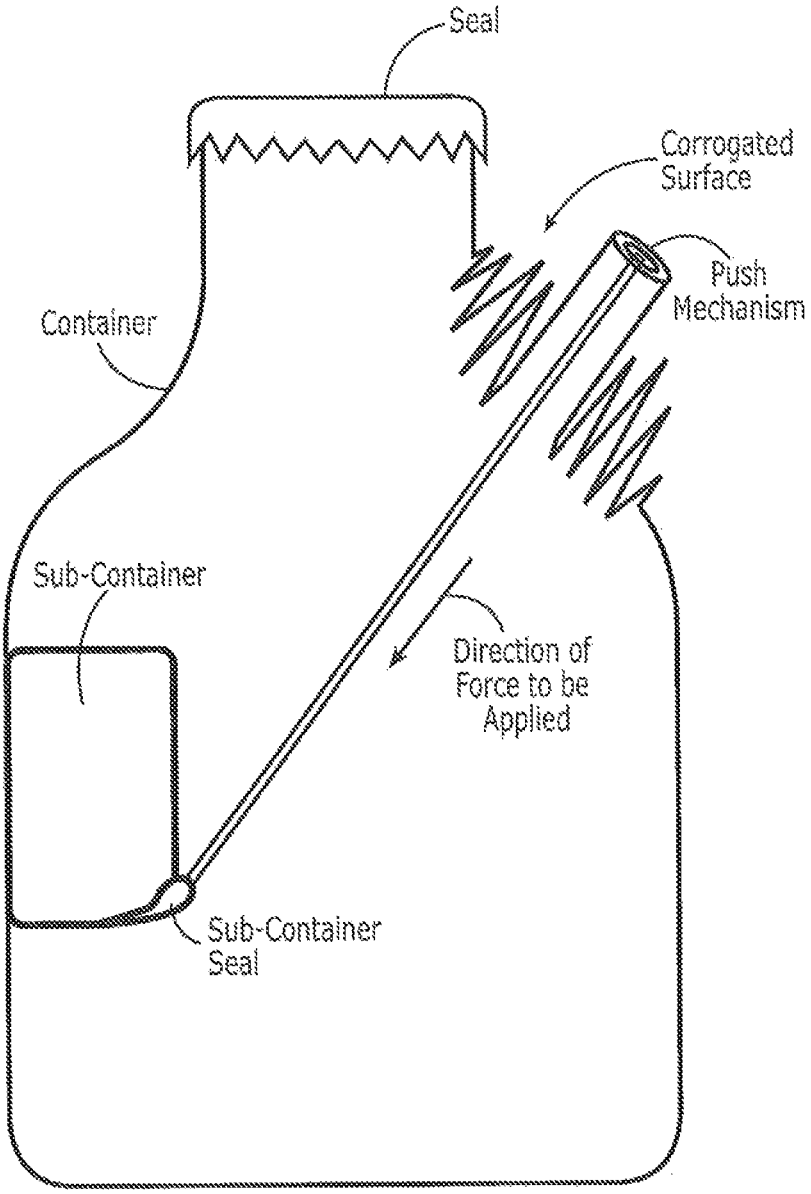
FIGS. 6-9 illustrate additional methods/systems of mixing first and second substances according to various embodiments of the present invention that do not require removal/opening of the seal of the container.

According to additional embodiments of the invention that will now be described, mixing between a first substance that is contained within a container and a second substance that is contained within an internal to the container sub-container, that is rigidly attached to an internal wall of the container, may occur even prior to opening a seal of the container. We have seen, for example, in embodiments according to FIG. 5, that the seal of the container must first be opened before a force can be exerted on the short and/or long tether to cause at least one of the sub-containers to open and thus yield mixing. In contrast, embodiments according to FIG. 6/7 and/or FIG. 8/9 can provide mixing before, after or even substantially concurrently with opening of the seal of the container, as desired. As is illustrated in FIG. 6, for example, a push mechanism is provided on a surface of the container. According to some embodiments, the push mechanism may advantageously be situated substantially centrally within a corrugated surface of the container so that upon pushing (i.e., upon exerting a force on the push mechanism towards a direction internal to the container), the push mechanism, being connected/coupled to a seal of a sub-container is opened (see FIG. 7) providing mixing of a substance contained within the container (not illustrated) with a substance contained within the sub-container (not illustrated).

Figure 7:
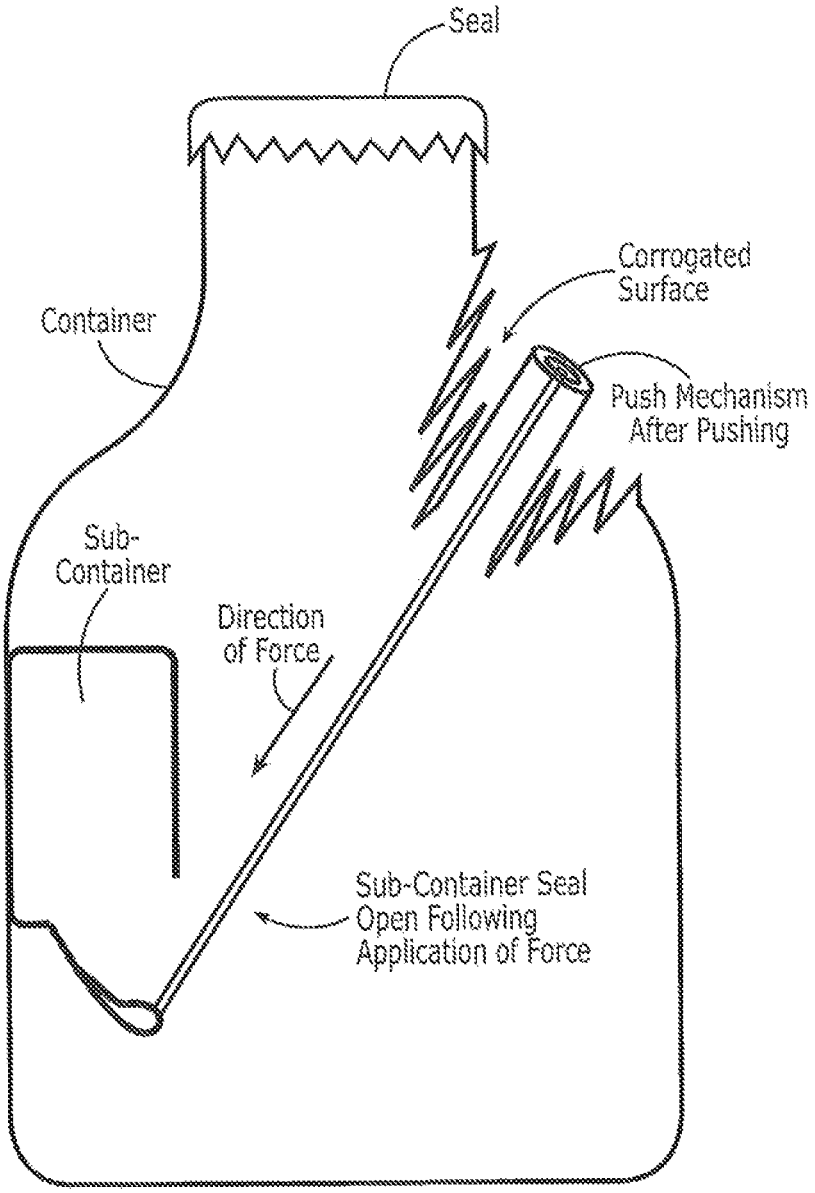

It will be understood that the corrugated surface on the container is provided, according to some embodiments, in order to allow the corrugated portion of the container to collapse in an inward direction (i.e., towards space that is, prior to the collapse, internal to the container), responsive to providing an inward pressure on the push mechanism, thus opening the seal of the sub-container to which the push mechanism is connected/coupled, as is illustrated in FIG. 6/7. It will be understood that in some embodiments, the corrugated surface may not be necessary if a configuration of a push mechanism that is connected/coupled to the sub-container's seal is provided that is capable of opening the sub-container's seal without the aid of the corrugated surface. It will further be understood that even though only one sub-container is illustrated in FIG. 6/7, a plurality of sub-containers, each including a respective substance, may be provided according to other embodiments. In such embodiments providing a plurality of sub-containers, a single push mechanism that is connected to the plurality of sub-containers may be used or a plurality of different push mechanisms may be used, connected/coupled according to any desired configuration, to the plurality of sub-containers. FIG. 7 illustrates a state of the embodiment of FIG. 6 after a force has been exerted on the push mechanism, the corrugated surface has collapsed in the inward direction and the sub-container seal has been opened in response to having exerted the force on the push mechanism. Note that the seal of the container is illustrated as being still unopened. Thus, according to the illustrative embodiment of FIG. 6/7, mixing is occurring prior to opening the seal of the container.

Figure 8:
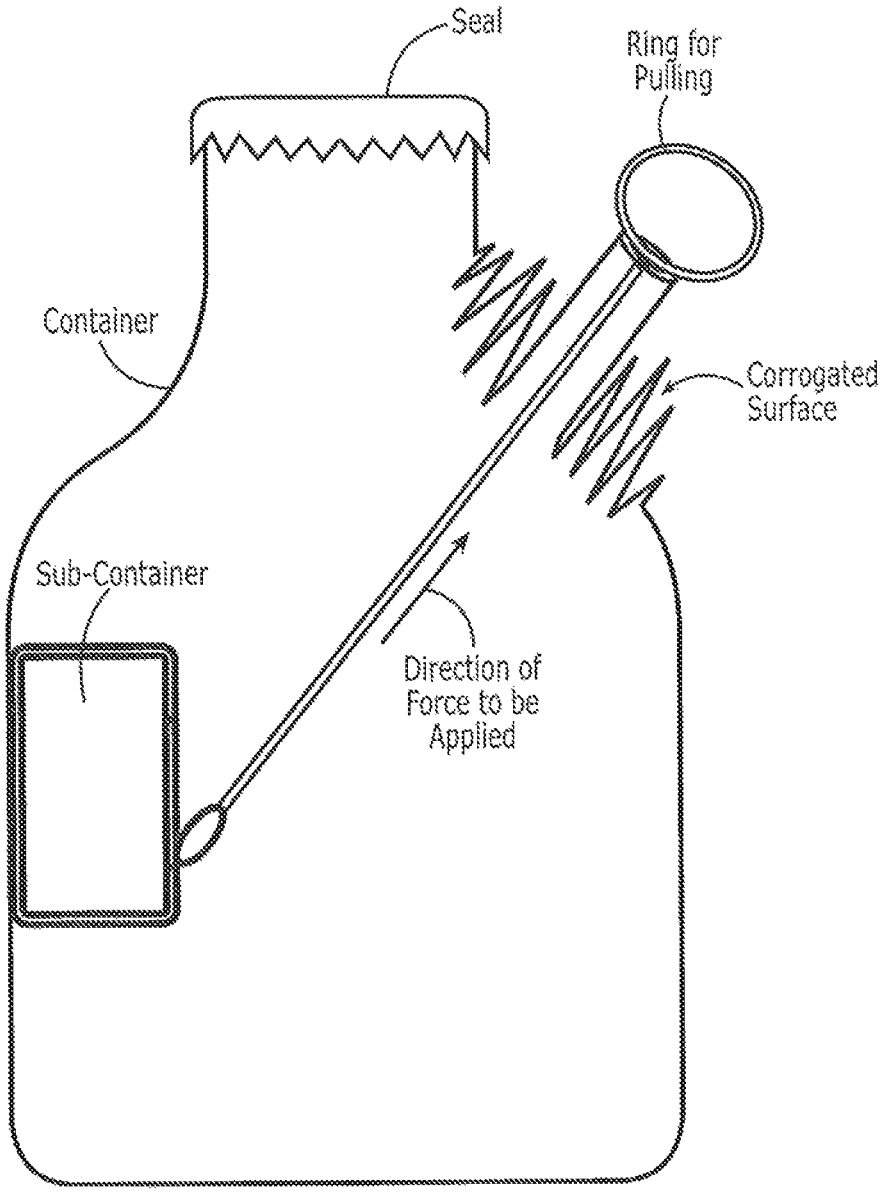
Figure 9:
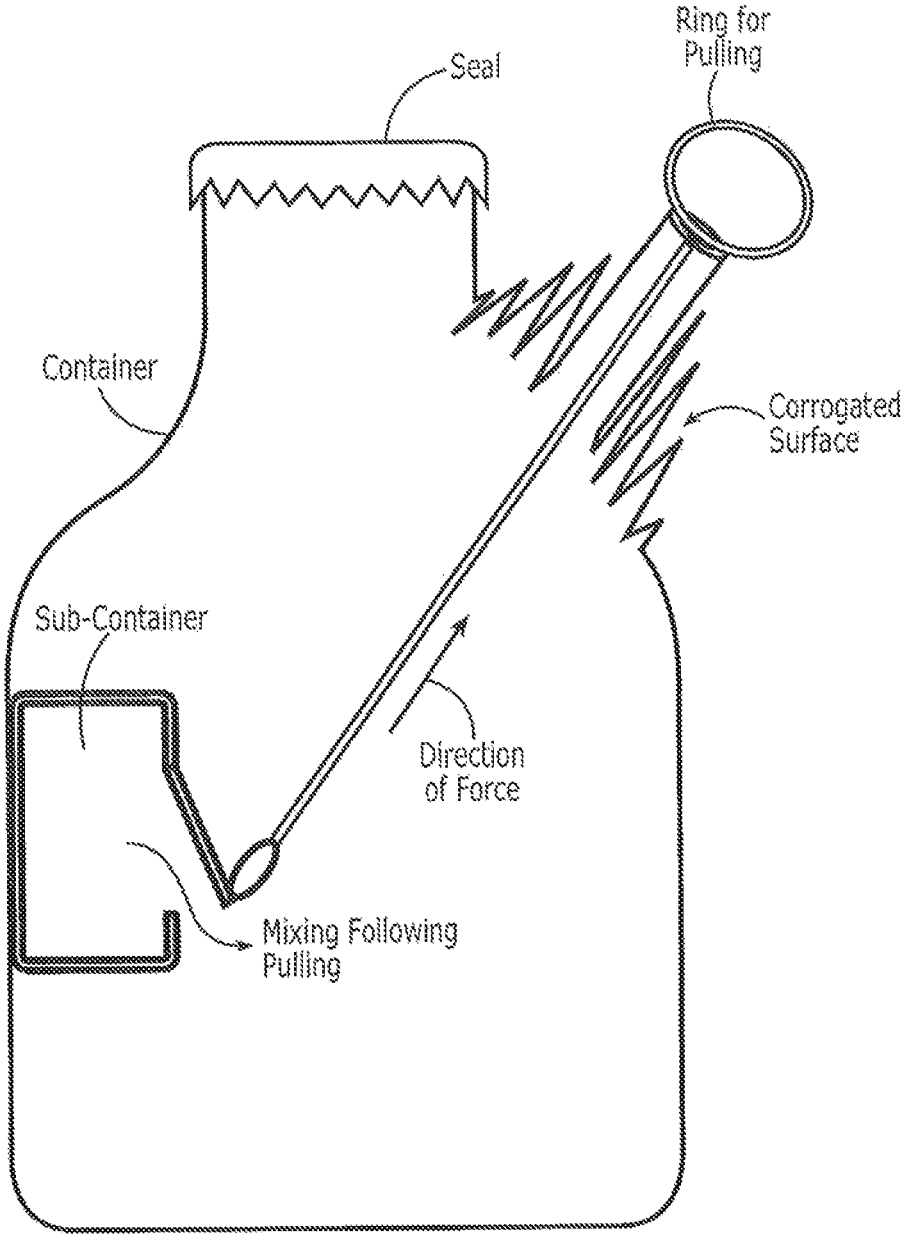

FIGS. 8 and 9 illustrate additional embodiments of mixing wherein a pull mechanism is used comprising, according to some embodiments, a ring/loop (as is illustrated in FIGS. 8/9) that is used to facilitate pulling. Accordingly, in these embodiments, mixing takes place by exerting an outward force (i.e., by pulling) on the pull mechanism, which causes the corrugated surface to deform outwards (towards space that is, prior to the pulling, external to the container) and owing to the pull mechanism being connected to a seal of the sub-container, responsively opening the seal of the sub-container and providing mixing as is illustrated in FIG. 9.

More specifically, according to additional embodiments of the invention, mixing may occur even prior to opening of a seal of a container. For example, in embodiments according to FIG. 5, the seal of the container must first be opened before an outward force can be exerted on the short and/or long tether to cause at least one of the sub-containers to open and thus yield mixing. In contrast, embodiments according to FIGS. 6, 7 and/or FIGS. 8, 9 provide mixing before or after opening of the seal of the container (or even substantially concurrently therewith), as may, for example, be determined by a preference of a user of the container. According to embodiments of FIG. 8, the pull mechanism may be situated substantially centrally within a corrugated surface of the container so that upon pulling (i.e., upon exerting a force on the pull mechanism towards a direction away from the container), the pull mechanism being connected/coupled to a seal of a sub-container responsively pulls on the seal of the sub-container and opens the seal of the sub-container providing mixing of a substance contained within the container (not illustrated) with a substance contained within the sub-container (not illustrated).

It will be understood that the corrugated surface may be provided, according to some embodiments, in order to allow the corrugated portion of the container to deform in an outward direction (i.e., towards space that is, prior to the deformation, external to the container), responsive to providing an outward force on the pull mechanism, thus opening the seal of the sub-container to which the pull mechanism is connected/coupled, as is illustrated in FIGS. 8, 9. It will be understood, however, that in further embodiments, the corrugated surface may not be necessary if a configuration of a pull mechanism that is connected to the sub-container seal is provided that is capable of opening the sub-container seal without the aid of the corrugated surface. It will further be understood that even though only one sub-container is illustrated in FIGS. 8, 9, a plurality of sub-containers, each including a respective substance, may be provided according to other embodiments. In such embodiments, a single pull mechanism that is connected to the plurality of sub-containers may be provided or a plurality of different pull mechanisms may be provided connected according to any desired configuration to the plurality of sub-containers and/or seals thereof. In some embodiments, a seal of a first sub-container may be connected/coupled to a push mechanism as that illustrated in FIG. 6, whereas a seal of a second sub-container may be connected/coupled to a pull mechanism as that illustrated in FIG. 8. FIG. 9 illustrates a state of the embodiment of FIG. 8 after a force has been exerted on the pull mechanism, the corrugated surface has deformed in the outward direction and the sub-container seal has been opened in response to having exerted the force on the pull mechanism. Note that the seal of the container is illustrated as being still unopened. Thus, according to the illustrative embodiment of FIG. 9, mixing is occurring prior to opening the seal of the container.

It will be understood that embodiments representing combinations, sub-combinations and/or variations of embodiments described herein may also be provided. For example, an embodiment may be provided comprising a container that includes two sub-containers wherein one sub-container of the two sub-containers is connected/coupled/attached to a push mechanism whereas the other sub-container of the two sub-containers is connected/coupled/attached to a pull mechanism.

Additional embodiments that provide mixing after removing a seal of a container or provide mixing substantially concurrently with removing of the seal of the container will now be described in reference to FIGS. 10-13. According to some of these embodiments, a container (e.g., a bottle), comprising, for example, a screw-top seal mechanism (or any other seal mechanism) may be provided with a coupling/connection between the seal mechanism and at least one seal of at least one sub-container that is within the container. It will be understood that said coupling/connection may be provided, according to some embodiments, between a component of the container, other than the seal mechanism, and the at least one seal of the at least one sub-container that is within the container (combinations of the above are also possible).

The seal mechanism (and/or said component of the container, other than the seal mechanism), may be coupled/connected to the at least one seal of the at least one sub-container in such a way so that when the seal mechanism (and/or said component of the container, other than the seal mechanism), is manipulated in order for the seal of the container to be opened/removed, the connection(s) thereof (and/or the connection(s) from said component of the container, other than the seal mechanism) to the at least one seal of the at least one sub-container is/are pulled/forced (i.e., a force is exerted thereon) resulting in opening of the at least one seal of the at least one sub-container and thus providing mixing between a substance that is contained within the container and at least one other substance that is contained within the at least one sub-container. Accordingly, with one action (e.g., twisting of the screw-top seal mechanism of the container/bottle), one may substantially simultaneously open the container/bottle and open the at least one seal of the at least one sub-container that is inside of the container and rigidly attached thereto. In some embodiments, said component of the container comprises first and second components of the container that differ therebetween in position and/or orientation. In some embodiments, the first component of the container comprises the seal of the container. In further embodiments of the invention, the first component of the container is the same as the second component of the container (e.g., first component of container=second component of container=seal of container).

It will be understood that according to some embodiments, said "at least one seal of at least one sub-container" comprises only one seal of only one sub-container. According to additional embodiments, said "at least one seal of at least one sub-container" comprises a plurality of seals associated with a respective plurality of sub-containers (e.g., one seal per sub-container of a plurality of sub-containers; two seals per sub-container of a plurality of sub-containers; one seal for a first sub-container; two seals for a second sub-container, etc.; the term "at least one seal of at least one sub-container" comprises any combination of seals and/or sub-containers). According to some embodiments, if M seals are associated with a sub-container, that sub-container may include up to M respective compartments each one of which may contain a substance that is different vis-à-vis any other substance contained in any other compartment of the sub-container; $M \geq 2$.

Figure 10:
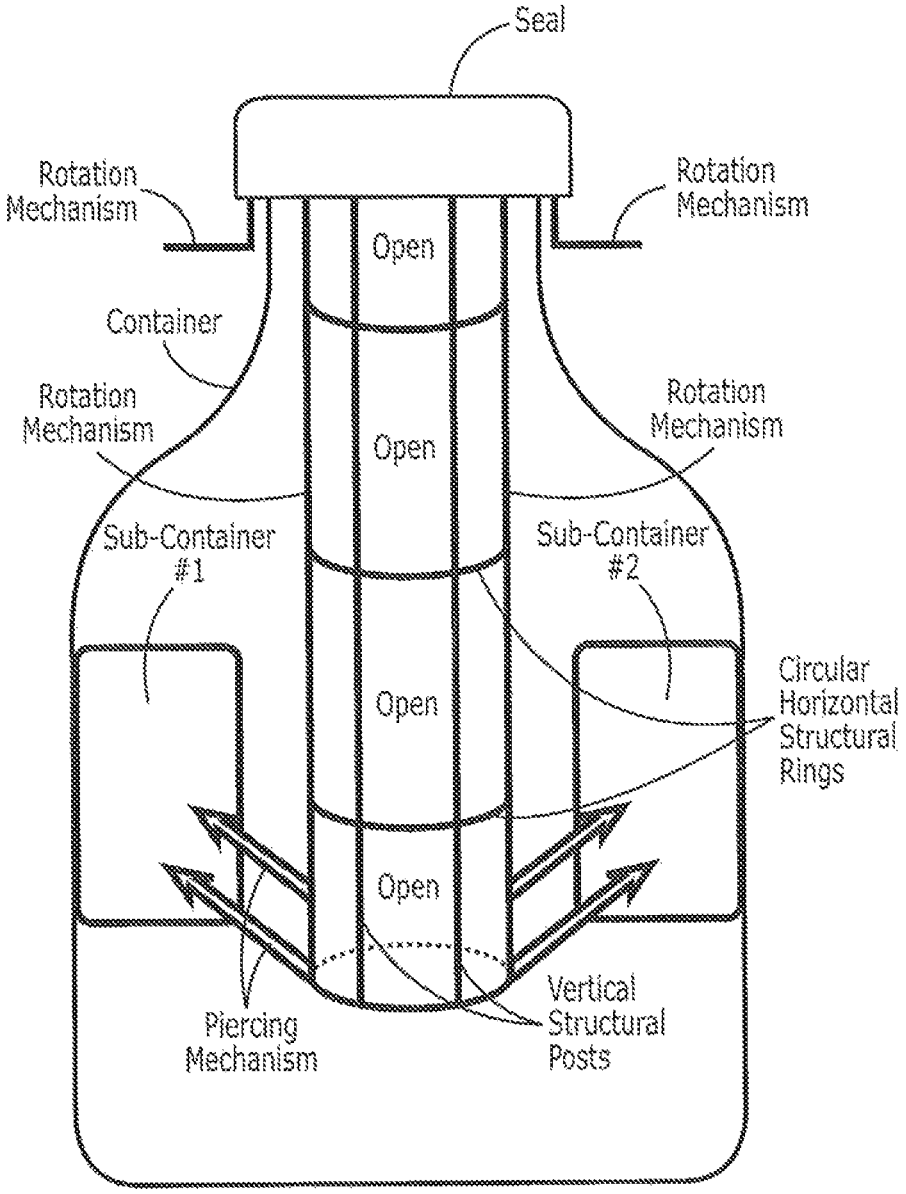
FIG. 10-13 illustrate yet additional methods/systems of mixing first and second substances using various rotational mixing mechanisms according to embodiments of the present invention.

FIG. 10 illustrates an embodiment, according to the invention, comprising a container that includes two sub-containers and a rotation mechanism that is held in-place and is not allowed to move/rotate by a seal of the container.

Figure 11:
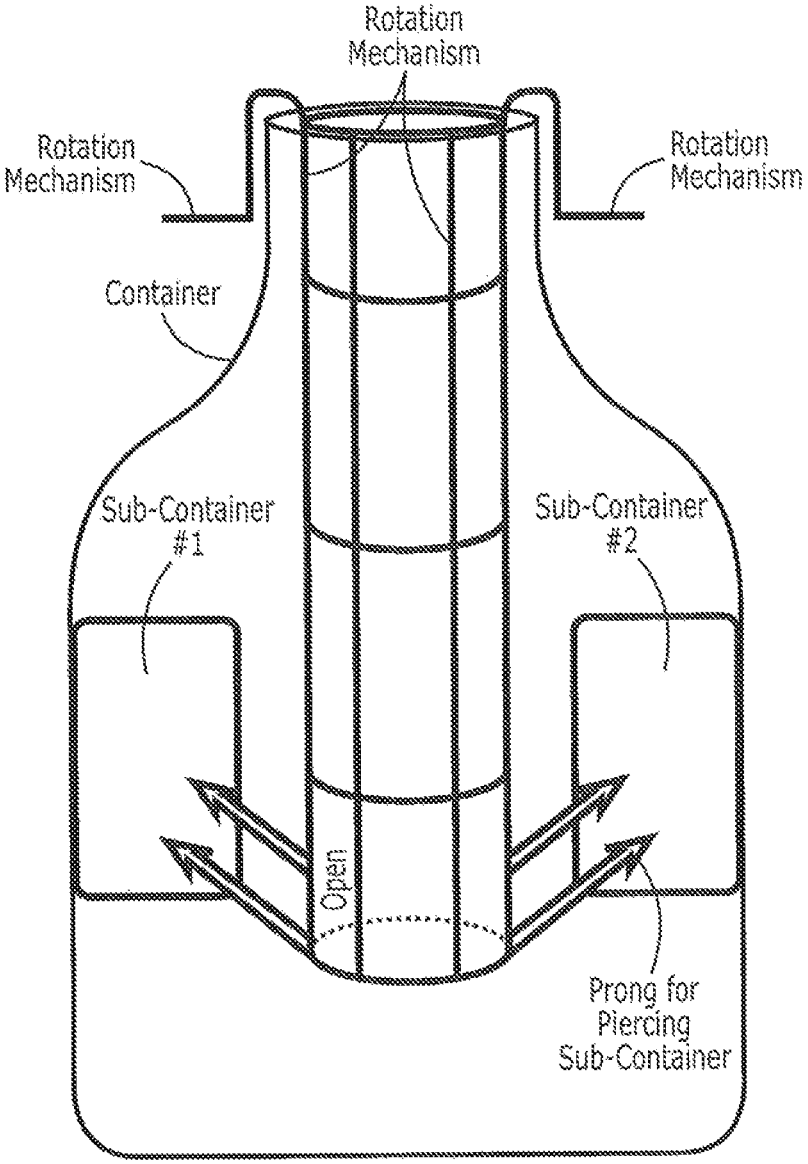
Figure 12:
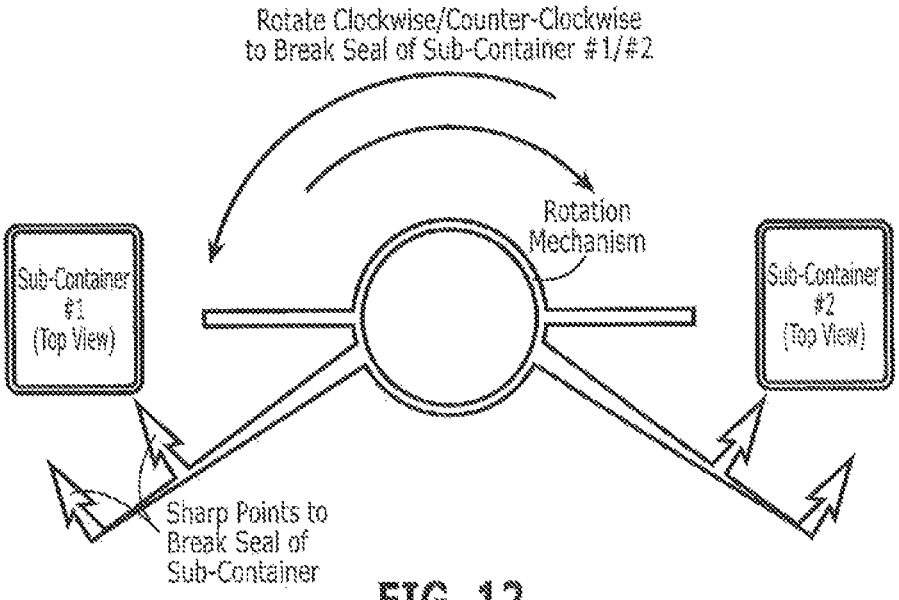
Figure 13:
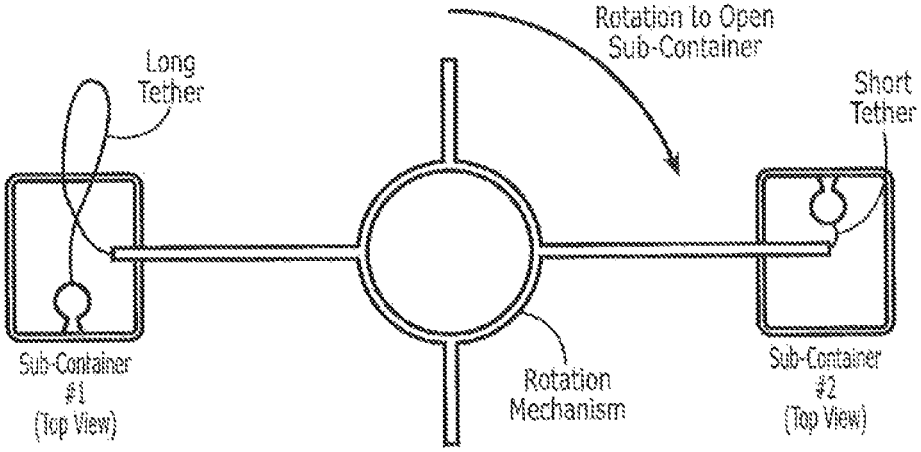

Following removal of the seal of the container, the rotation mechanism is configured so that it can move/rotate responsive to a force (clockwise or counter-clockwise) that may be applied to the rotation mechanism. As is illustrated in FIGS. 10-12, the rotation mechanism may be configured with a piercing mechanism so that, responsive to a force, the piercing mechanism may pierce/break a seal of a sub-container, thus releasing a substance of the sub-container and allowing the substance of the sub-container to mix with a content/substance of the container. In some embodiments, the rotation mechanism may be configured to be able of movement even prior to removing the seal of the container, thus allowing mixing before seal removal and/or concurrently with seal removal. FIG. 13 provides additional embodiments wherein the rotation mechanism is connected/coupled/attached to at least one seal of at least one sub-container, is devoid of the piercing mechanism, and is configured to open the at least one seal of the at least one sub-container responsive to a clockwise and/or counter-clockwise force/rotation and to being connected/coupled/attached to the at least one seal of the at least one sub-container.

There are many applications of the mixing embodiments described herein and of the many combinations, sub-combinations and/or variations thereof that will surely occur to those skilled in the art. For example, numerous applications may be identified in medicine and in the pharmaceutical industry that may be based on one or more of the systems/methods disclosed herein, providing mixing of first and second substances, as necessary, only a short time prior to dispensing thereof and/or in accordance with predetermined amounts of the first and second substances. Further, numerous applications may be identified in the beverage industry (alcoholic and/or non-alcoholic beverage industries) that may also be based upon various systems/methods disclosed herein, providing alcoholic and/or non-alcoholic mixing of a plurality of substances, as desired, a short time prior to dispensing and consuming thereof and/or in accordance with precisely measured predetermined amounts, maximizing taste and enjoyment for the consumer.

Figure 14:
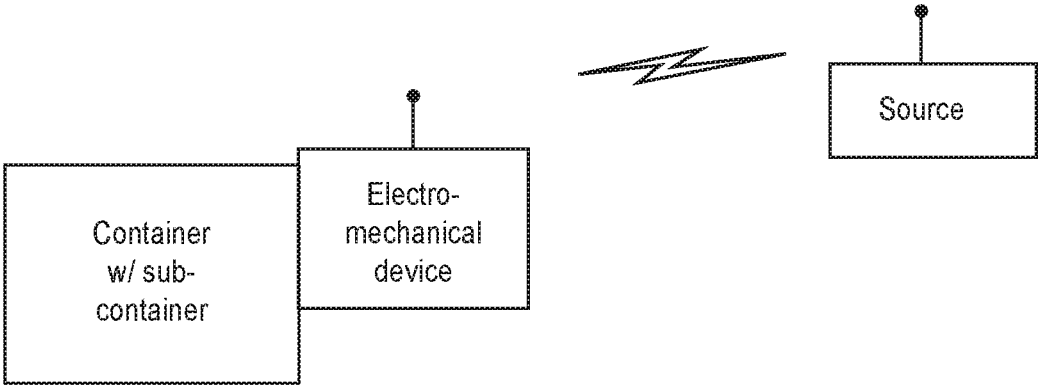
FIG. 14 illustrates an example remote application of mixing first and second substances using systems/methods of the present invention.

[Remote applications] *FIG. 14 illustrates an example remote application* of mixing first and second substances using systems/methods of the present invention [may also occur to those skilled in the art]. For example, responsive to receiving a signal at a predetermined location (wirelessly and/or otherwise), an embodiment according to the invention may be used to initiate mixing of first and second substances. More specifically, responsive to having received a predetermined signal from a predetermined source at the predetermined location, a command may be provided to, for example, an electro-mechanical device to exert a force (e.g., a push, pull and/or turn), as appropriate, in order to initiate mixing of the first and second substances. That is, the mixing may be done automatically by machine, not by a person. Such automatic mixing, using an embodiment of the present invention coupled with an electromechanical device/machine, may be initiated responsive to a value of position, a value of time, a value of a biometric parameter and/or having received the predetermined signal from the predetermined source. In some embodiments, the predetermined source may be a transmitter and/or computer associated with a doctor, clinic, central facility and/or hospital. Further, following the automatic mixing, an automatic dispensing of the mixed first and second substances may take place.

We can imagine a regime whereby biometric information is sent (wirelessly) from sensors on a person to a central facility for analysis (e.g., sensors are attached to the person to measure and send the biometric data). Responsive to the analysis, we can also imagine a signal being sent (wirelessly) from the central facility to the person (e.g., to the person's smart phone and/or to any other receiver associated with the person). Further, we can imagine that, responsive to such a signal a configuration is used whereby the automatic mixing takes place followed by the automatic dispensing. For example, the person may be diabetic needing a blood sugar correction. Accordingly, we can imagine a regime whereby the person is fitted with a mixing device in accordance with one or more embodiments of the present invention and comprising an electromechanical adjunct that enables the automatic mixing and/or automatic dispensing. Many other applications will occur to those skilled in the art including military applications relating to mixing substances and dispensing substances relating to munitions.

It will be understood that the term substance (or substances) as used herein may comprise any molecular structure and may be classified as a solid, liquid and/or gas. Accordingly, many different embodiments stem from the above description and the accompanying drawings. It will be understood that it would be unduly repetitious and obfuscating to literally describe and illustrate every combination, sub-combination and variation of these embodiments. Accordingly, the present specification, including the drawings and claims thereof, shall be construed to constitute a complete written description of all combinations, sub-combinations and variations of the embodiments described herein, and of the manner and process of making and using them, and shall support claims to any such combination, sub-combination or variation. Stated differently, while the present invention has been described in detail by way of illustration and example of preferred embodiments, numerous modifications, substitutions and/or alterations are possible without departing from the scope of the invention as described herein. Numerous combinations, sub-combinations, modifications, alterations and/or substitutions of embodiments described herein will become apparent to those skilled in the art. Such combinations, sub-combinations, modifications, alterations and/or substitutions of the embodiments described herein may be used to form one or more additional embodiments without departing from the scope of the present invention.

The present invention has been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

When an element is referred to as being coupled or connected to/with another element, it can be directly coupled or connected to/with the other element or intervening elements may also be present. In contrast, if an element is referred to as being directly coupled or connected to/with another element, then no other intervening elements are present. As used herein, the term "and/or" includes any and all combinations of one or more of the associated listed items. The symbol "/" is also used as a shorthand notation for "and/or".

It will be understood that although terms such as first and second are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer and/or section that may be discussed herein could be termed a second element, component, region, layer and/or section, and similarly, a second element, component, region, layer and/or section could be termed a first element, component, region, layer and/or section without departing from the teachings of the present invention. Like numbers refer to like elements throughout.

The terminology used herein is for the purpose of describing particular embodiments only and is not intended to be limiting of the invention. [As used herein, the singular forms "a", "an" and "the" are intended to include the plural forms as well, unless the context clearly indicates otherwise.] It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the specification and the drawings, there have been disclosed embodiments of the invention and, although specific terms are employed, they are used in a generic and descriptive sense only and not for purposes of limitation; the scope of the invention being set forth in the following claims.

What is claimed is:

1. A container apparatus comprising:

a container that includes [a seal and] a first substance;

a first sub-container that is rigidly attached to the container and is contained within the container and includes a seal and a second substance; [and]

a second sub-container that is rigidly attached to the container and is contained within the container and includes a seal and a third substance; *and*

[wherein the seal of the container is configured to expose] a mixing mechanism [upon removal thereof from the container] *that is coupled to the container, the first sub-container, and the second sub-container*;

wherein the mixing mechanism is configured to open the seal of the first sub-container by exerting a force on the seal of the first sub-container responsive to a first force that is exerted on the mixing mechanism; *and* wherein the mixing mechanism is further configured to open the seal of the second sub-container by exerting a force on the seal of the second sub-container responsive to a second force that is exerted on the mixing mechanism[; and wherein the seal of the container is devoid of coupling to the mixing mechanism following-removal thereof from the container].

2. The container apparatus according to claim 1, wherein the first force that is exerted on the mixing mechanism comprises a rotational force.

3. The container apparatus according to claim 1, wherein the second force that is exerted on the mixing mechanism comprises a rotational force.

4. The container apparatus according to claim 1, wherein said first and second forces comprise:

a first rotational force in a first direction; and a second rotational force in a second direction that differs from the first direction.

5. The container apparatus according to claim 1, wherein the first substance comprises beer, the second substance comprises Irish cream and the third substance comprises whiskey.

6. The container apparatus according to claim 1, wherein said first and second forces comprise:

a first rotational force in a first direction; and a second rotational force in the first direction.

*7. The container apparatus according to claim 1, wherein the first substance comprises a solid.*

*8. The container apparatus according to claim 1, wherein the first substance comprises a liquid.*

*9. The container apparatus according to claim 1, wherein the first substance comprises a gas.*

*10. The container apparatus according to claim 1, wherein the mixing mechanism is further configured to open the seal of the first sub-container and to open the seal of the second sub-container substantially simultaneously with one another.*

*11. The container apparatus according to claim 1, wherein exerting a force on the seal of the first sub-container comprises piercing the seal of the first sub-container.*

*12. The container apparatus according to claim 1, wherein exerting a force on the seal of the second sub-container comprises piercing the seal of the second sub-container.*

*13. The container apparatus according to claim 1, wherein the mixing mechanism comprises first and second prongs that are configured to pierce the seal of the first sub-container and the seal of the second sub-container, respectively, responsive to the first and second forces, respectively.*

*14. The container apparatus according to claim 1, wherein the mixing mechanism is directly coupled to the container, the first sub-container, and the second sub-container.*

*15. A container apparatus comprising:*

*a container that includes a first substance;*

*a first sub-container that is rigidly attached to the container and is contained within the container and includes a seal and a second substance;*

*a second sub-container that is rigidly attached to the container and is contained within the container and includes a seal and a third substance; and*

*a rotatable structure that is coupled to the container, the first sub-container, and the second sub-container, and that is configured to rotate inside the container responsive to a first force and a second force that are exerted on the rotatable structure;*

*wherein the rotatable structure is further configured to open the seal of the first sub-container by exerting a force on the seal of the first sub-container responsive to the first force; and*

*wherein the rotatable structure is further configured to open the seal of the second sub-container by exerting a force on the seal of the second sub-container responsive to the second force.*

*16. The container apparatus according to claim 15, wherein the rotatable structure comprises first and second prongs that are configured to pierce the seal of the first*

*sub-container and the seal of the second sub-container, respectively, responsive to the first and second forces, respectively.*

*17. The container apparatus according to claim 16, wherein the rotatable structure further comprises a rotatable vertical structure from which the first and second prongs extend.*

*18. The container apparatus according to claim 17,*

*wherein the rotatable vertical structure comprises a cylindrical structure, and*

*wherein the first and second prongs extend radially from the cylindrical structure.*

*19. A container apparatus comprising:*

*a container that includes a first substance;*

*a first sub-container that is rigidly attached to the container and is contained within the container and includes a seal and a second substance;*

*a second sub-container that is rigidly attached to the container and is contained within the container and includes a seal and a third substance; and*

*a structure that is inside the container and that is coupled to the container, the first sub-container, and the second sub-container;*

*wherein the structure is configured to open the seal of the first sub-container by exerting a force on the seal of the first sub-container responsive to a first force that is exerted on the structure; and*

*wherein the structure is further configured to open the seal of the second sub-container by exerting a force on the seal of the second sub-container responsive to a second force that is exerted on the structure.*

*20. The container apparatus according to claim 19, wherein the structure is configured to rotate inside the container responsive to the first force and the second force.*

* * * * *